June 2, 1936.　　　H. E. HARING　　　2,042,840
STORAGE BATTERY
Filed July 8, 1933　　2 Sheets-Sheet 1

INVENTOR
H. E. HARING
BY H. G. Bandfield
ATTORNEY

June 2, 1936.  H. E. HARING  2,042,840

STORAGE BATTERY

Filed July 8, 1933   2 Sheets-Sheet 2

INVENTOR
H. E. HARING
BY
ATTORNEY

Patented June 2, 1936

2,042,840

UNITED STATES PATENT OFFICE 2,042,840

STORAGE BATTERY

Horace E. Haring, Summit, N. J., assignor to Bell Telephone Laboratories, Incorporated, New York, N. Y., a corporation of New York Application July 8, 1933, Serial No. 679,480

10 Claims. (Cl. 136—65)

This invention relates in general to storage batteries and more particularly to the electrodes or grids of such batteries.

Storage batteries sulphate and as a consequence lose their charge either in the course of normal operation or merely as the result of standing for some time on open circuit. In the first case, the conversion of the sponge lead of the negative plates and the lead dioxide (frequently termed lead peroxide) of the positive plates to lead sulphate is an essential reaction and results in the generation of usable electrical energy. In the second case, the formation of lead sulphate serves no useful purpose, the electrical energy which is generated is dissipated, and the battery slowly discharges. Repeated sulphation of this character which has been considered more or less a necessary evil materially decreases the life and efficiency of the battery.

In the manufacture of storage battery plates and grids, lead antimony alloys are universally used, an alloy containing approximately 9% antimony being the one used most generally. It has been found with such alloys that in the course of normal operation of the battery, antimony is leached out of the positive electrode, passes through the solution, deposits on the negative plate and thus produces local action and self discharge. This leaching out of the antimony from the alloy of the positive plate gradually weakens the plate and eventually results in structural failure. Furthermore, the antimony present in the alloy of the negative plate also is responsible for self discharge although to a lesser degree than the antimony plated over to the negative plate. It is a well-known fact that antimony diffuses through lead at an appreciable rate, thus continually presenting antimony at the surface of the plate in contact with the electrolyte. Antimonial lead is employed in storage battery construction because of its metallurgical and physical properties and not as the result of a consideration of its suitability from the electrochemical standpoint. From the latter standpoint, only metals should be used with lead which are electro-negative to lead, that is less noble than lead. Furthermore, the added metal or metals should show little or no tendency toward diffusion and segregation.

It is an object of the present invention to provide an improved storage battery, the electrodes or grids of which are superior from a structural standpoint, and also are so constituted that self-discharge of the battery is greatly decreased.

A further object of the invention is a storage battery having increased efficiency of operation and increased life and moreover one which can be manufactured economically.

To attain these objects and in accordance with the features of the invention there is provided a storage battery in which the plates or plate supports or grids are formed of lead alloyed with a metal which is electro-negative to lead, the alloy metal being preferably calcium in an amount less than 1%.

The invention may be more clearly understood by referring to the attached drawings in which, Fig. 1 is a conventional type of storage battery, the electrodes of which represent one embodiment of the invention;

Figure 1:
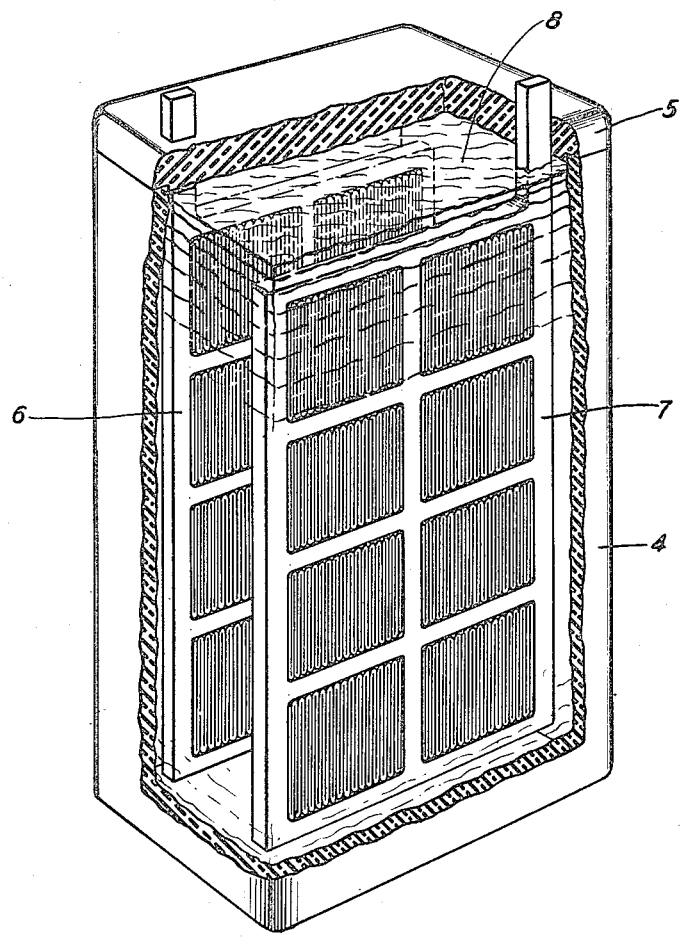

Referring to Fig. 1 there is shown the conventional form of storage battery consisting of a jar or container 4 provided with a suitable cover 5 and electrodes 6, 7 which are immersed in a suitable electrolyte 8. While only a single negative and a single positive electrode are shown, it will be understood that in practice a plurality of negative and positive electrodes will be employed.

In accordance with the invention the plates 6, 7 or the grids thereof are composed of a lead calcium alloy such as disclosed in detail in Patent No. 1,890,013 of December 6, 1932 to R. S. Dean. As described in this patent in the preparation of this alloy a quantity of calcium is alloyed with a sufficient quantity of lead to produce an alloy containing less than 1% calcium and the alloy caused to solidify. The solidified alloy is then heated at a temperature sufficiently high and for a sufficiently long period of time to cause substantially all of the resulting solute constituent to enter the solid solution in the lead and the alloy is then cooled from an elevated temperature at a sufficiently rapid rate to cause some of this solute constituent to remain in the lead in the form of a super-saturated solid solution, after which the alloy is caused to assume a more stable state by aging. By this process there is produced an alloy consisting of a matrix of lead throughout which a large number of minute particles containing calcium are substantially uniformly dispersed. It is important that the aging step be carried on at a temperature sufficiently low so that little agglomeration of the finely dispersed particles results and it has been found that satisfactory results are obtained when the alloy is aged at a temperature below 150° C.

In the construction of the plates or grids from this alloy, the parts may be formed therefrom and then subjected to the above heating, cooling and aging operations or else the alloy may be first reduced in the form of a solid solution and the parts produced therefrom while the alloy is hot, after which the plate is cooled and aged in the above manner. Preferably, the amount of calcium in the alloy ranges from 0.02% to 0.1%. With such an alloy the calcium does not diffuse out as does antimony.

Figure 2:
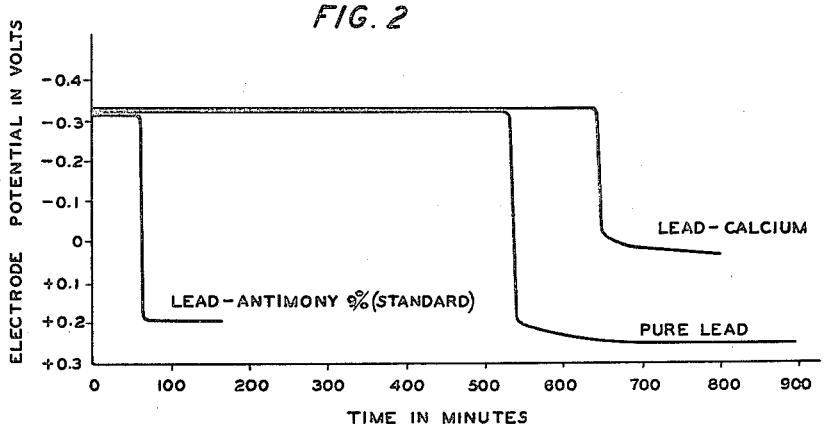
Fig. 2 shows typical sulphation curves of various types of electrodes.

In Fig. 2 are typical curves obtained on individual samples and showing the rate at which sulphation takes place when using plates of lead-antimony (9%), pure lead and lead calcium (0.08%). In these tests, electrodes consisting of small cylinders were soldered to copper wires and sealed into the ends of glass tubes. Immediately before use the entire surface of the metal was scraped clean with a knife. During the test the electrodes were immersed in a relatively large volume of 7—N sulphuric acid and continuous measurements of the potential of the metal electrodes against the solution were made by means of a mercurous sulphate electrode and a recording potentiometer. The averages of five determinations such as disclosed by the curves of Fig. 2 and made on individual plates, show that the sulphation time for the lead antimony alloy was approximately 57 minutes, the time for spectroscopically pure lead was 500 minutes and the time for the lead calcium alloy was 570 minutes. It is to be noted that the lead-antimony alloy sulphated in approximately one-ninth the time required for pure lead and one-tenth the time required for the lead calcium alloy.

Figure 3:
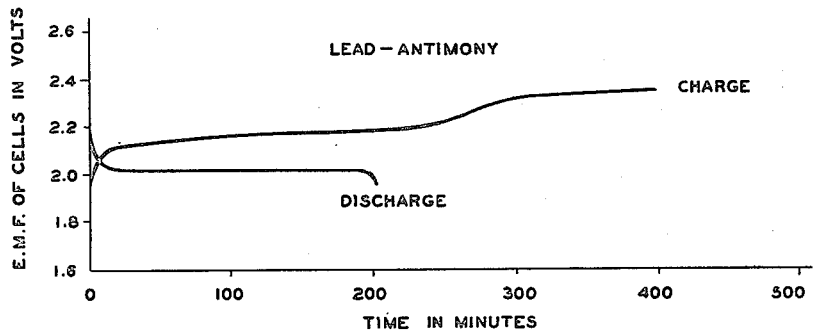
Figs. 3 and 4 show charge-discharge curves of lead-antimony and lead-calcium plate batteries, respectively.
Figure 4:
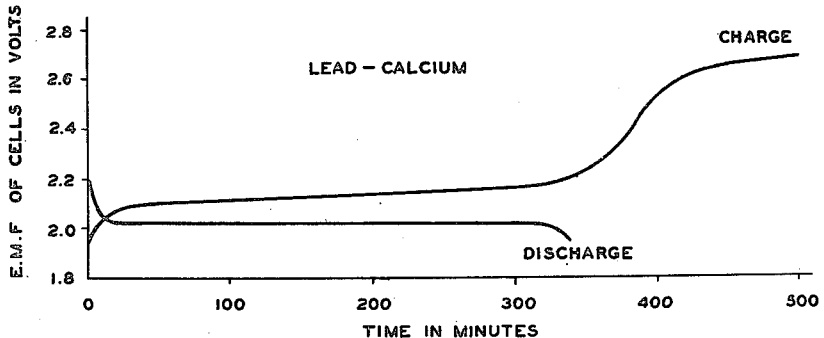

The results of a comparison of the operating characteristics of batteries constructed from lead-antimony and lead-calcium alloys are shown in Figs. 3 and 4. In these experiments typical cells of Planté type were used, the lead-antimony alloy containing 1% antimony and the lead-calcium alloy containing 0.05% calcium. Planté plates were employed rather than pasted plates because of their homogeneity, which allowed results to be more easily interpreted. The plates were immersed in the electrolyte of 7—N sulphuric acid.

In the formation of the plates a series of charges, discharges and reversals in dilute nitric-acid was followed by a similar treatment in 7—N sulphuric acid until the capacities became substantially constant. After the forming process the cells were put through a series of charge and discharge cycles at a rate which gave a discharge time of between three and four hours in order to stabilize the capacity and determine a suitable finishing charge voltage. Following the determination of the optimum operating conditions, each cell was charged and discharged a number of times at a given rate and the terminal voltages of the cells for typical cycles are shown.

It will be noted that the differences in the characteristics of the two cells are as follows: First, the capacity of the lead-antimony cell as indicated by the sharp drop in voltage at the end of the discharge curve, Fig. 3, is only 60% of that of the lead calcium cell (Fig. 4), notwithstanding the fact that the two cells were formed in series under identical conditions. Second, the discharge time of the lead-antimony cell (Fig. 3) is approximately 75% of the charge time required to produce vigorous gasing as indicated by the break upward in the potential curve while in the case of the lead calcium cell (Fig. 4) this value is 95%. Third, the overcharge voltage of the lead-antimony cell (Fig. 3) is somewhat lower than that of the lead calcium cell (Fig. 4).

Further analysis with a mercurous sulphate electrode indicated that the great difference in the behavior of the two cells was due largely to the action of the negative plates. The lead calcium negative begins to show an abrupt rise in voltage characteristic of gasing almost immediately after a charge equal to the discharge has been put into the cell. On the other hand, the lead-antimony negative is considerably slower in rising to its final value, which is about 0.25 volt less than that for a lead calcium cell. The positive plates exhibit the same difference but only to a slight degree.

The advantages of the lead calcium plates or grids over lead antimony as disclosed above are as follows: Lead-antimony alloys sulphate much more rapidly than pure lead. The rate of sulphation of lead calcium is of the same order as that of pure lead. Storage cells constructed of lead calcium have a much lower rate of self-discharge than lead antimony cells. Storage cells constructed of lead calcium have a higher efficiency than cells constructed with lead antimony.

Since, as pointed out above, the rate of self discharge in standard types of storage batteries is due largely to the transfer of antimony from the positive to the negative plate, it will be apparent that a decided improvement in operation would result from making the positive plate of lead-calcium alloy even though the negative plate is made of the standard lead antimony alloy.

In certain forms of grids for the pasted type of plates, intricate castings are required and in molding such structures it may be desirable, in order to facilitate the flowing of the metal in the molds to add to the alloy a small amount of another metal which also is electro-negative to lead, such for example as cadmium.

What is claimed is:

1. A storage battery electrode, a portion of which is composed of an alloy consisting of lead and calcium, the amount of the calcium content being not greater than 1%.

2. A storage battery electrode, a portion of which is composed of an alloy consisting of lead and calcium, the amount of the calcium content being from 0.02% to 0.1%.

3. A storage battery electrode, a portion of which is composed of an alloy consisting of lead and calcium, the amount of the calcium content being approximately 0.1%.

4. A storage battery electrode, a portion of which is composed of a binary alloy consisting of a matrix of lead throughout which a large number of minute particles containing calcium are substantially uniformly dispersed, the total calcium content being not greater than 1%.

5. A storage battery electrode, a portion of which is composed of an age-hardened alloy consisting of lead and calcium containing from 0.02% to 0.1% calcium.

6. A storage battery electrode composed of a ternary alloy of lead, calcium and a metal electro-negative to lead, the lead content being not less than 99% and the remainder consisting of calcium and cadmium.

7. A storage battery electrode of the pasted type in which the grid portion is composed of an alloy consisting of lead and calcium, the amount of the calcium content being not greater than 1%.

8. A storage battery electrode of the pasted type in which the grid portion is composed of an alloy consisting of lead and calcium, the amount of the calcium content being from 0.02% to 0.1%.

9. A storage battery electrode of the pasted type in which the grid portion is composed of an alloy consisting of lead and calcium, the amount of the calcium content being approximately 0.1%.

10. A storage battery electrode of the Planté type composed of an alloy consisting of lead and calcium, the amount of the calcium content being not greater than 1%.

HORACE E. HARING.